(12) United States Patent
Kopp et al.

(10) Patent No.: US 10,119,426 B2
(45) Date of Patent: Nov. 6, 2018

(54) SLIDE VALVE FOR A WASTE HEAT RECOVERY SYSTEM

(71) Applicant: Robert Bosch GmbH, Stuttgart (DE)

(72) Inventors: Jeannette Kopp, Stuttgart (DE); Bernd Berghaenel, Illingen (DE); Luiz-Alexandre Colodel, Stuttgart (DE); Sophie-Charlotte Deger-Panthene, Stuttgart (DE); Stephan Wehr, Heiligenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/375,598

(22) Filed: Dec. 12, 2016

(65) Prior Publication Data

US 2017/0167308 A1 Jun. 15, 2017

(30) Foreign Application Priority Data

Dec. 14, 2015 (DE) .................. 10 2015 225 035

(51) Int. Cl.
| | |
|---|---|
| *F01K 23/10* | (2006.01) |
| *F16K 11/07* | (2006.01) |
| *F02G 5/02* | (2006.01) |
| *F01K 25/08* | (2006.01) |

(52) U.S. Cl.
CPC ............ *F01K 23/101* (2013.01); *F01K 25/08* (2013.01); *F02G 5/02* (2013.01); *F16K 11/0716* (2013.01); *F02G 2270/90* (2013.01)

(58) Field of Classification Search
CPC .... F01K 23/101; F01K 25/08; F16K 11/0716; F02G 5/02; F02G 2270/90

USPC ............................................ 60/651, 670–671
See application file for complete search history.

(56) References Cited

U.S. PATENT DOCUMENTS

| | | | | |
|---|---|---|---|---|
| 3,060,970 A | * | 10/1962 | Aslan ..................... | F16K 11/07 |
| | | | | 137/625.43 |
| 4,770,210 A | * | 9/1988 | Neff ..................... | F15B 11/044 |
| | | | | 137/884 |
| 5,829,735 A | | 11/1998 | Ikeda | |
| 6,349,743 B1 | * | 2/2002 | Staiger ................. | F16K 25/005 |
| | | | | 137/625.69 |

(Continued)

FOREIGN PATENT DOCUMENTS

| | | |
|---|---|---|
| DE | 852322 | 10/1952 |
| DE | 102010024186 A1 | 12/2011 |

(Continued)

*Primary Examiner* — Hoang Nguyen (74) *Attorney, Agent, or Firm* — Michael Best & Friedrich LLP (57) ABSTRACT

Slide valve (1), in particular for a waste heat recovery system of a combustion engine, having a valve housing (4), wherein an inlet passage (5) and an outlet passage (6) are formed in the valve housing (4). A substantially cylindrical slide (3) is guided in a longitudinally movable manner in a guide bore (20) in the valve housing (4), wherein the guide bore (20) can be connected hydraulically to the inlet passage (5) and to the outlet passage (6). A closing body (35, 35*a*) is arranged on the slide (3), wherein a slide seat (75, 75*a*) is formed between the guide bore (20) and the closing body (35, 35*a*). The guide bore (20) and the sliding body (35, 35*a*) form a sliding pair, wherein the sliding pair has the material combination steel-graphite or the material combination ceramic-graphite.

16 Claims, 4 Drawing Sheets

(56) References Cited

U.S. PATENT DOCUMENTS

| | | | |
|---|---|---|---|
| 7,093,819 B1* | 8/2006 | Hall | F16K 5/0642 |
| | | | 251/214 |
| 2012/0161054 A1* | 6/2012 | Frank | F16K 25/005 |
| | | | 251/324 |
| 2015/0377077 A1* | 12/2015 | Laboe | F01K 23/10 |
| | | | 60/650 |

FOREIGN PATENT DOCUMENTS

| | | |
|---|---|---|
| DE | 102012113010 A1 | 7/2013 |
| DE | 102013211875 A1 | 1/2015 |
| DE | 102013021395 A1 | 6/2015 |
| EP | 2014962 A1 | 1/2009 |
| JP | 2006177527 A | 7/2006 |

* cited by examiner

SLIDE VALVE FOR A WASTE HEAT RECOVERY SYSTEM

BACKGROUND OF THE INVENTION

The invention relates to a slide valve, in particular for a waste heat recovery system of a combustion engine.

Slide valves are known in many different embodiments from the prior art. A slide valve for a waste heat recovery system of a combustion engine is known from German Application DE 10 2015 217114 A1, which is not a prior publication.

The known slide valve comprises a valve housing, wherein an inlet passage and an outlet passage are formed in the valve housing. A substantially cylindrical slide is guided in a longitudinally movable manner in a guide bore in the valve housing. The guide bore can be connected hydraulically to the inlet passage and to the outlet passage. A closing body is arranged on the slide. A slide seat is formed between the guide bore and the closing body. In this arrangement, the guide bore and the sliding body form a sliding pair.

SUMMARY OF THE INVENTION

The sliding contacts of the slide valve according to the invention are embodied in such a way that it is very resistant to chemicals, temperature-stable and wear-resistant. In particular, it is thus very well-suited to use in a waste heat recovery system of a combustion engine.

For this purpose, the slide valve has a valve housing, wherein an inlet passage and an outlet passage are formed in the valve housing. A substantially cylindrical slide is guided in a longitudinally movable manner in a guide bore in the valve housing. The guide bore can be connected hydraulically to the inlet passage and to the outlet passage. A closing body is arranged on the slide, wherein a slide seat is formed between the guide bore and the closing body. The guide bore and the sliding body form a sliding pair. In this arrangement, the sliding pair has the material combination steel-graphite or the material combination ceramic-graphite.

The material combinations steel-graphite or the material combination ceramic-graphite make the friction contacts or sliding pairs particularly resistant to chemicals, temperature-stable and wear-resistant.

It is advantageous if the sliding pair has the material combination stainless steel-graphite. Thus, the two friction partners, namely the closing body and the guide bore, are made from stainless steel or graphite. This sliding pair is particularly corrosion-resistant. Here, the stainless steel is preferably in the form of M340 steel made by the Böhler company.

In an advantageous embodiment, the sliding pair has the material combination steel-graphite and the steel is coated with a Ti(C,N)+$MoS_2$ coating, preferably with Tribobond 62. By virtue of this coating, the sliding pair has particularly low friction. In this context, the Tribobond 62 coating, made by the Ionbond company, has proven particularly advantageous in tests.

In alternative advantageous embodiments, the sliding pair has the material combination ceramic-graphite, wherein the ceramic is a $ZrO_2$ or $Al_2O_3$ ceramic. These friction contacts or sliding pairs are also particularly resistant to chemicals, more specifically corrosion-resistant, temperature-stable and wear-resistant.

In advantageous developments, the graphite is provided with metal additives. As a result, the sliding pair is particularly wear-resistant and has particularly low friction.

It is advantageous if the graphite is an EK305, EK3255 or EK3245 graphite. These graphites, made by the SGL company, are optimized in terms of friction.

In advantageous developments of the slide valve, a further outlet passage is formed in the valve housing. The guide bore can be connected hydraulically to the further outlet passage. A further closing body is arranged on the slide. A further slide seat is formed between the guide bore and the further closing body. The guide bore and the further closing body form a further sliding pair, wherein the further sliding pair has the material combination steel-graphite or the material combination ceramic-graphite. For the abovementioned reasons, the material combination of the further sliding pair is preferably analogous to the material combination of the sliding pair.

In advantageous developments of the slide valve, a valve tube is arranged in the valve housing and the guide bore is formed in the valve tube. The valve tube is comparatively simple to produce. Thus, all the bores can be produced at low cost. Moreover, this also enables more complex flow geometries to be designed since the valve housing and the valve tube can be produced separately from one another before assembly. Accordingly, the valve tube can be produced easily from the desired material, e.g. graphite.

It is advantageous if the valve tube is embodied as a graphite bushing. This makes the valve tube very easy to produce. Moreover, the tribological conditions at the slide seat and, where applicable, also at the further slide seat are thus also optimized.

In an advantageous embodiment, the slide valve according to the invention is arranged in a waste heat recovery system of a combustion engine. The waste heat recovery system comprises a circuit carrying a working medium, wherein the circuit comprises, in the direction of flow of the working medium, a pump, an evaporator, a bypass valve, an expansion machine and a condenser. A bypass line is arranged in parallel with the expansion machine, wherein the bypass valve controls the mass flow of the working medium to the expansion machine and to the bypass line. The bypass valve is the slide valve according to the invention. It must be possible to operate the bypass valve at high temperatures and with aggressive working media. The slide valve according to the invention is therefore very suitable as a bypass valve. In this way, the mass flow of the working medium can be divided as desired between the expansion machine and the bypass line. This can be performed in accordance with the degree of evaporation of the working medium or in accordance with the temperature of the working medium, for example.

It is advantageous if the working medium of the waste heat recovery system contains ethanol or cyclopentane or constituents thereof. These are very aggressive working media, especially at high temperatures. The slide valve according to the invention is therefore particularly suitable for use with working media of this kind.

The bypass valve can preferably be operated at a temperature of the working medium of 300° C. The above-described material combinations of the sliding pair comprising the guide bore and the closing body make the slide seat suitable even for temperatures of 300° C.

DETAILED DESCRIPTION

Figure 1:
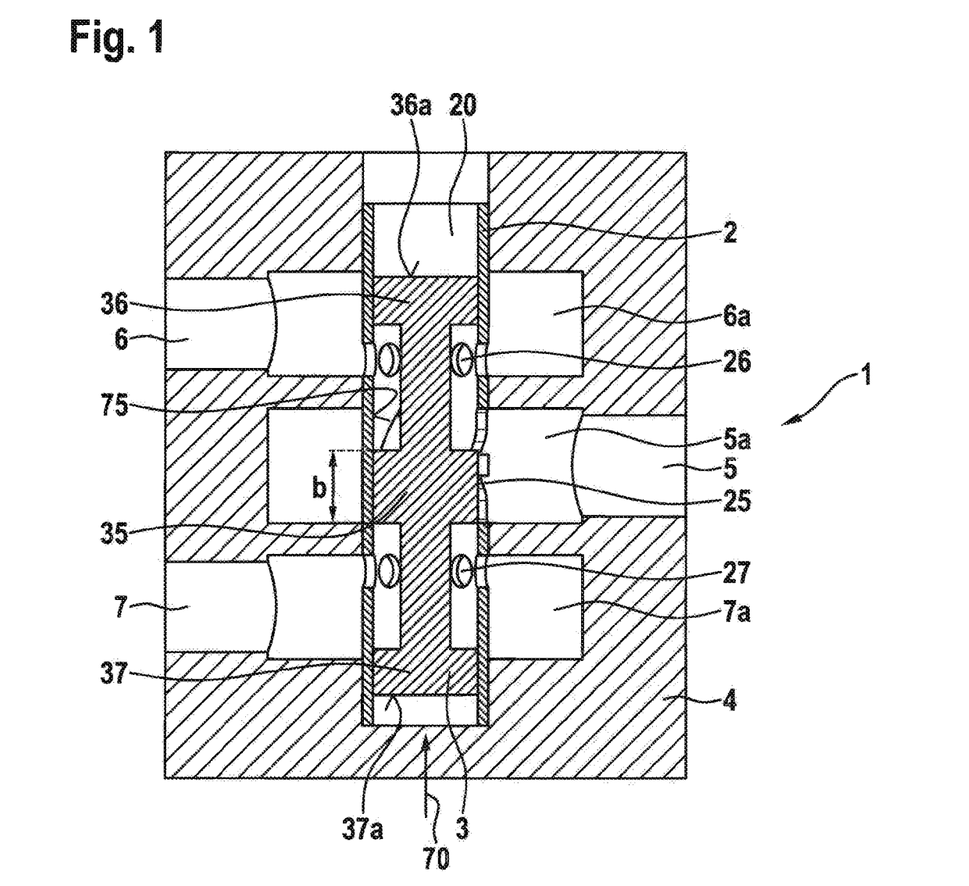
FIG. 1 shows a longitudinal section through an illustrative embodiment of the slide valve according to the invention, wherein only the essential regions are shown.

FIG. 1 shows a longitudinal section through an illustrative embodiment of the slide valve 1 according to the invention, wherein only the essential regions are shown. The slide valve 1 is embodied as a proportional valve in order to distribute a mass flow of a working fluid in an infinity variable manner. In the illustrative embodiment in FIG. 1, the slide valve 1 is embodied as an inlet-controlled slide valve.

The slide valve 1 comprises a valve housing 4, in which a valve tube 2 is arranged, being press-fitted for example. An inlet passage 5 having an annular inlet groove 5a, an outlet passage 6 having an annular outlet groove 6a, and a further outlet passage 7 having a further annular outlet groove 7a are formed in the valve housing 4. Here, the annular inlet groove 5a, the annular outlet groove 6a and the further annular outlet groove 7a are arranged in such a way that they surround the valve tube 2 radially, wherein the annular inlet groove 5a is arranged between the two annular outlet grooves 6a, 7a in the axial direction. As an alternative, the inlet passage 5 can also be formed at the end, i.e. in the axial direction, e.g. by means of a bore in the slide 3.

A row of inlet bores 25, a first row of outlet bores 26 and a second row of outlet bores 27 are formed in the valve tube 2, wherein each row is in each case arranged in the form of a ring around the circumference of the valve tube 2. In the illustrative embodiment under consideration, the row of inlet bores 25 comprises three inlet bores 25, wherein the inlet bores 25 are each of slot-shaped configuration. In this illustrative embodiment, the rows of first outlet bores 26 and of second outlet bores 27 each comprise six bores.

In alternative embodiments, any number (≥1) of bores can be chosen for the individual rows of inlet bores 25, first outlet bores 26 and second outlet bores 27. It is merely necessary to ensure that sufficiently large flow cross sections of the individual rows of bores for the mass flow of the working fluid are provided.

The valve tube 2 is positioned in the valve housing 4 in such a way that the inlet bores 25 are arranged radially within the annular inlet groove 5a, the first outlet bores 26 are arranged within the annular outlet groove 6a and the second outlet bores 27 are arranged within the further annular outlet groove 7a.

A guide bore 20, into which the inlet bores 25, the first outlet bores 26 and the second outlet bores 27 open radially, is formed in the longitudinal direction in the valve tube 2. In the illustrative embodiment in FIG. 1, the row of inlet bores 25 is arranged between the rows of first outlet bores 26 and second outlet bores 27, when viewed in the longitudinal direction 70.

A slide 3 is arranged in a longitudinally movable manner in the guide bore 20, wherein the longitudinal movement of the slide 3 is controlled by a control device (not shown). In this context, the control device can be drivable electromagnetically, piezoelectrically, pneumatically or hydraulically, for example, that is to say, in principle, by means of a motor of any type. The longitudinal movement of the slide 3 divides the mass flow of the working fluid between the outlet passage 6 and the further outlet passage 7. In the illustrative embodiment in FIG. 1, the division of the mass flow is inlet-controlled, i.e. at the inlet bore 25.

For this purpose, an inlet-side closing body 35 is formed on the slide 3, said closing body forming, with the guide bore 20, a slide seat 75 in the region of the inlet bores 25 in order to open and close the inlet bores 25 in that the closing body 35 exposes or covers the inlet bores 25. In the longitudinal direction 70 of the valve tube 2, the closing body 35 preferably has a width b which is less than the extent of the inlet bores 25 in this direction. For this purpose, it is also possible, in alternative embodiments, for a plurality of inlet bores 25 to be arranged offset when viewed in the longitudinal direction 70.

In the central position of the slide 3—i.e. in a position open to both outlet bores 26, 27 and both outlet passages 6, 7—the closing body 35 of the slide 3 is arranged between the inlet bores 25 in the axial direction or longitudinal direction 70 in the guide bore 20, and therefore covers the slide seat 75 centrally; in this case, the closing body 35 can partially but not completely cover the inlet bores 25. In this position, a first hydraulic connection from the inlet passage 5 to the outlet passage 6 is open, as is simultaneously also a second hydraulic connection from the inlet passage 5 to the further outlet passage 7.

In contrast, the closing body 35 closes the second hydraulic connection in a first end position of the slide 3, and closes the first hydraulic connection in a second end position of the slide 3. The entire mass flow of the working medium is then passed through the other hydraulic connection in each case. As an alternative, the stroke of the slide 3 can also be set so that, in the first end position, the closing body 35 does not completely close the second hydraulic connection and that, in the second end position, the closing body 35 does not completely close the first hydraulic connection. In this way, it is possible for 5%-10% of the working medium mass flow to be passed through the respective incompletely closed hydraulic connection, for example, in order thereby to raise the respective downstream components to high temperatures or hold them at high temperatures.

Arranged at opposite ends of the slide 3 are first sliding body 36 and a second sliding body 37, which can have several functions:

radial support for the slide 3 in the guide bore 20 sealing between the valve tube 2 and the slide 3 outside the inlet and outlet regions and outside the hydraulic connections forming further slide seats for opening and closing the first and second outlet bores 26, 27.

In a third end position of the slide 3, the first sliding body 36 can preferably cover the first outlet bore 26 or, alternatively, the second sliding body 37 can cover the second outlet bore 27, with the result that the associated first hydraulic connection or second hydraulic connection is closed. At the same time, the closing body 35 closes the other hydraulic connection, with the result that both hydraulic connections are closed. In this embodiment, the first end position and the second end position would, to be precise, become intermediate positions, although these would each still completely close one of the two hydraulic connections. Instead of a first, second and third end position, it is also possible to refer to a first, second and third closing position. This also applies to the following further illustrative embodiments.

In advantageous embodiments, the two outer end faces 36a, 37a of the two sliding bodies 36, 37 are subjected to the same pressure, and therefore the slide valve 1 is configured as a pressure-balanced valve. This pressure can be atmospheric pressure, for example, but can also be the pressure prevailing in the inlet passage 5 or in the outlet passages 6, 7.

The closing body 35 and also the first sliding body 36 and the second sliding body 37 interact with the guide bore 20 by sliding in the latter in the axial direction. Sliding contacts or sliding pairs are thereby formed, and these are subject to corrosion risks and potential wear. According to the invention, these sliding pairs now have a material combination which minimizes wear. This applies especially to operation with working media that are poor lubricants and are aggressive, such as those used in a waste heat recovery system. According to the invention, the material combination steel/graphite or ceramic/graphite can be used in this context.

For example, the closing body 35 can be manufactured from an M340 stainless steel made by the Böhler company, and the guide bore 20 and valve tube 2 can be manufactured from graphite EK305 made by the SGL company, wherein the material combination can also be reversed. As an alternative to a graphite component, the component can also be provided with a graphite coating.

The material combinations from the first sliding body 36 to the guide bore 20 and from the second sliding body 37 to the guide bore 20 can preferably be embodied in a manner similar to the slide seat 75.

As alternatives to graphite EK305, the graphites EK3255 and EK3245 made by the SGL company can also be used. In alternative embodiments, the sliding partner steel or stainless steel can also be embodied with a coating, e.g. Tribobond 62. Tribobond 62 is a special Ti(C,N)+MoS$_2$ coating made by the Ionbond company, which is extremely corrosion- and wear-resistant. If a ceramic is used for one sliding partner instead of steel, the ceramics ZrO$_2$ or Al$_2$O$_3$ should preferably be chosen for this purpose, these ceramics having an extremely high wear resistance and resistance to chemicals.

At the same time, the material combinations described for the guide bore 20 and the closing body 35 have particularly good tribological conditions, especially very low static and dynamic friction coefficients. In order to improve the tribological conditions further, in particular to reduce friction, the graphite is preferably provided with metallic additives.

Figure 2:
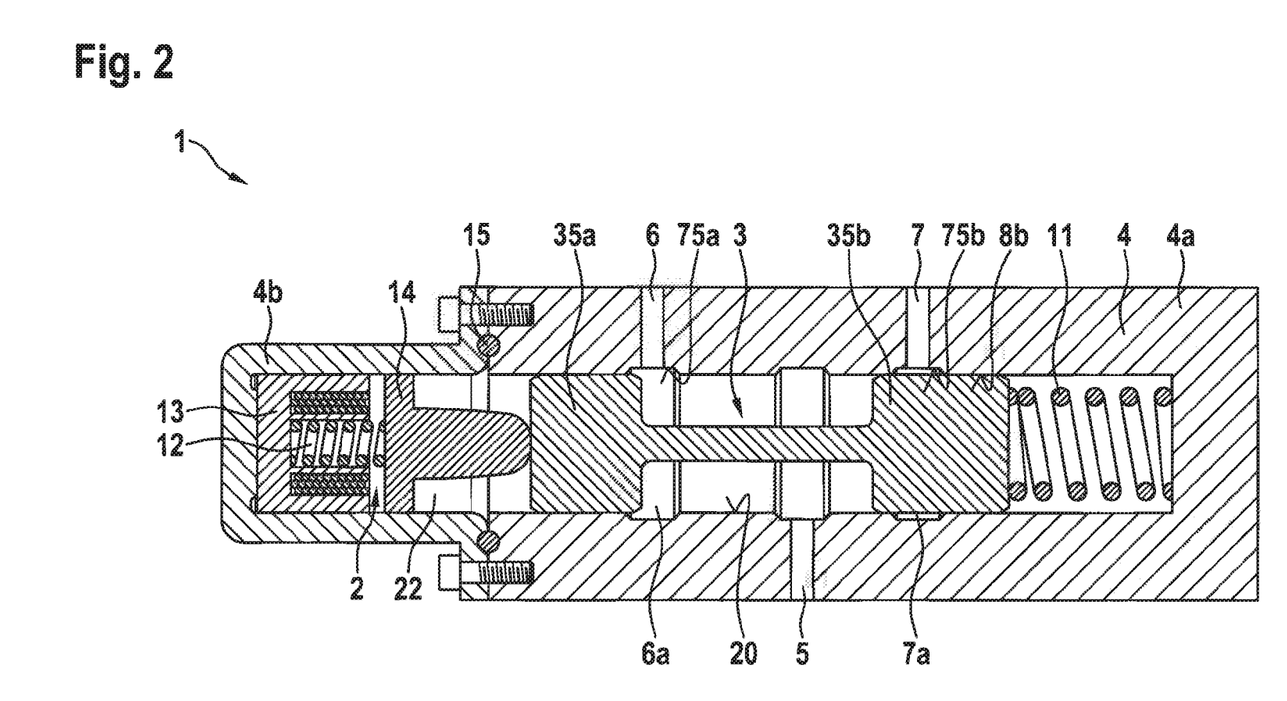
FIG. 2 shows another illustrative embodiment of the slide valve according to the invention in longitudinal section, wherein only the essential regions are shown.

FIG. 2 shows, by way of example, a slide valve 1 having electromagnetic control of the slide valve 1. In this embodiment, the slide valve 1 is embodied as an outlet-controlled slide valve. However, the same electromagnetic control can also be used for inlet-controlled slide valves of the kind shown in FIG. 1, for example.

In the illustrative embodiment in FIG. 2, the division of the mass flow takes place under outlet control, i.e. at the two outlet bores 26, 27.

For this purpose, a closing body 35a is formed at one end of the slide 3, and a further closing body 35b is formed at the opposite end. Each of the two closing bodies 35a, 35b forms a slide seat 75a, 75b with the guide bore 20 formed in the valve housing 4. Here, the closing body 35a interacts with the first outlet bore 26 and with it forms the slide seat 75a in order to open and close the first outlet bore 26 and accordingly to open and close the first hydraulic connection from the inlet passage 5 to the outlet passage 6. At the same time, the further closing body 35b interacts to the opposite extent with the second outlet bore 27 and with it forms the further slide seat 75b in order to open and close the second outlet bore 27 and accordingly to open and close the second hydraulic connection from the inlet passage 5 to the further outlet passage 7. This means that, to the extent to which the through flow cross section through the first hydraulic connection is increased by the stroke of the slide 3, the through flow cross section for the second hydraulic connection is reduced and vice versa.

In the central position of the slide 3—i.e. in an open position relative to both outlet bores 26, 27 and to both outlet passages 6, 7—the two closing bodies 35a, 35b of the slide 3 can cover the two outlet bores 26, 27 partially but not completely. In this position, the first hydraulic connection and the second hydraulic connection are open to the same extent, and therefore the mass flows into the outlet passage 6 and into the further outlet passage 7 are of the same magnitude.

In a first end position of the slide 3, the closing body 35a covers the slide seat 75a completely or partially and thus closes the first hydraulic connection completely or partially, and, in a second end position of the slide 3, the further closing body 35b covers the further slide seat 75b completely or partially and thus closes the second hydraulic connection completely or partially. The entire mass flow or a large proportion, e.g. 85%-95%, of the mass flow of the working medium is then passed through the other hydraulic connection in each case.

In the illustrative embodiment in FIG. 2, the slide valve 1 is arranged in a two-part valve housing 4, comprising a first housing part 4a and a second housing part 4b. Here, the slide 3 is guided in a longitudinally movable manner in the first housing part 4a without a valve tube being arranged in between. However—in a manner similar to the embodiment in FIG. 1—it is also possible, in alternative embodiments, for a valve tube to be arranged radially between the slide 3 and the first housing part 4a.

The first housing part 4a is screwed to the second housing part 4b with a seal placed in between. An electromagnetic actuator 13 having a coil is arranged in the second housing part 4b. Arranged adjoining the actuator 13 in the axial direction is an armature 14, which is pushed away from the actuator 13 by an armature spring 12. In this case, the armature spring 12 is arranged in a bore formed in the actuator 13.

The armature 14 interacts with the slide 3, in this specific embodiment with the closing body 35a of the slide 3. Arranged in the first housing part 4a, on the opposite side of the slide 3 from the armature 14, is a bracing spring 11, which also interacts with the slide 3, in the specific embodiment in FIG. 2 with the further closing body 35b. The bracing spring 11 counteracts the armature spring 12, with the result that the slide 3 is braced between these two springs 11, 12.

When the actuator 13 is energized, it attracts the armature 14 counter to the spring force of the armature spring 12, thus enabling the bracing spring 11 to move the slide 3 in the direction of the actuator 13. The slide valve 1 is then in a position as illustrated in FIG. 2. The closing body 35a exposes the outlet passage 6, and the further closing body 35b covers the further slide seat 75b and thus closes the further outlet passage 7. In this end position, the first hydraulic connection is open and the second hydraulic connection is closed.

When the energization of the actuator 13 is ended, the armature spring 12 pushes the slide 3 in a direction away from the actuator 13, counter to the spring force of the bracing spring 11. The closing body 35a then covers the slide seat 75a and thus closes the outlet passage 6, and the further closing body 35b exposes the further outlet passage 7. In this opposite end position, the first hydraulic connection is closed and the second hydraulic connection is open.

Through specific designs of the two springs 11, 12, including as progressive springs for example, and through changing the actuator force of the actuator 13 on the basis of the changing of the intensity of energization, the slide 3 can also be moved into any desired intermediate positions. It is thereby possible to use the slide valve 3 as a proportional mass flow splitter for the two outlet passages 6, 7.

In the illustrative embodiment in FIG. 2 too, the sliding partners in the two slide seats 75a, 75b should be chosen so that there is steel-graphite contact or ceramic-graphite contact, in a manner similar to the embodiment in FIG. 1. For this purpose, for example, the valve housing 4, in particular the first housing part 4a with the guide bore 20, can be embodied in stainless steel, preferably M340, and the two closing bodies 35a, 35b can be embodied in graphite, preferably EK305. The two closing bodies 35a, 35b can also each be embodied as a graphite bushing, which is press-fitted onto the slide 3, for example.

Figure 3:
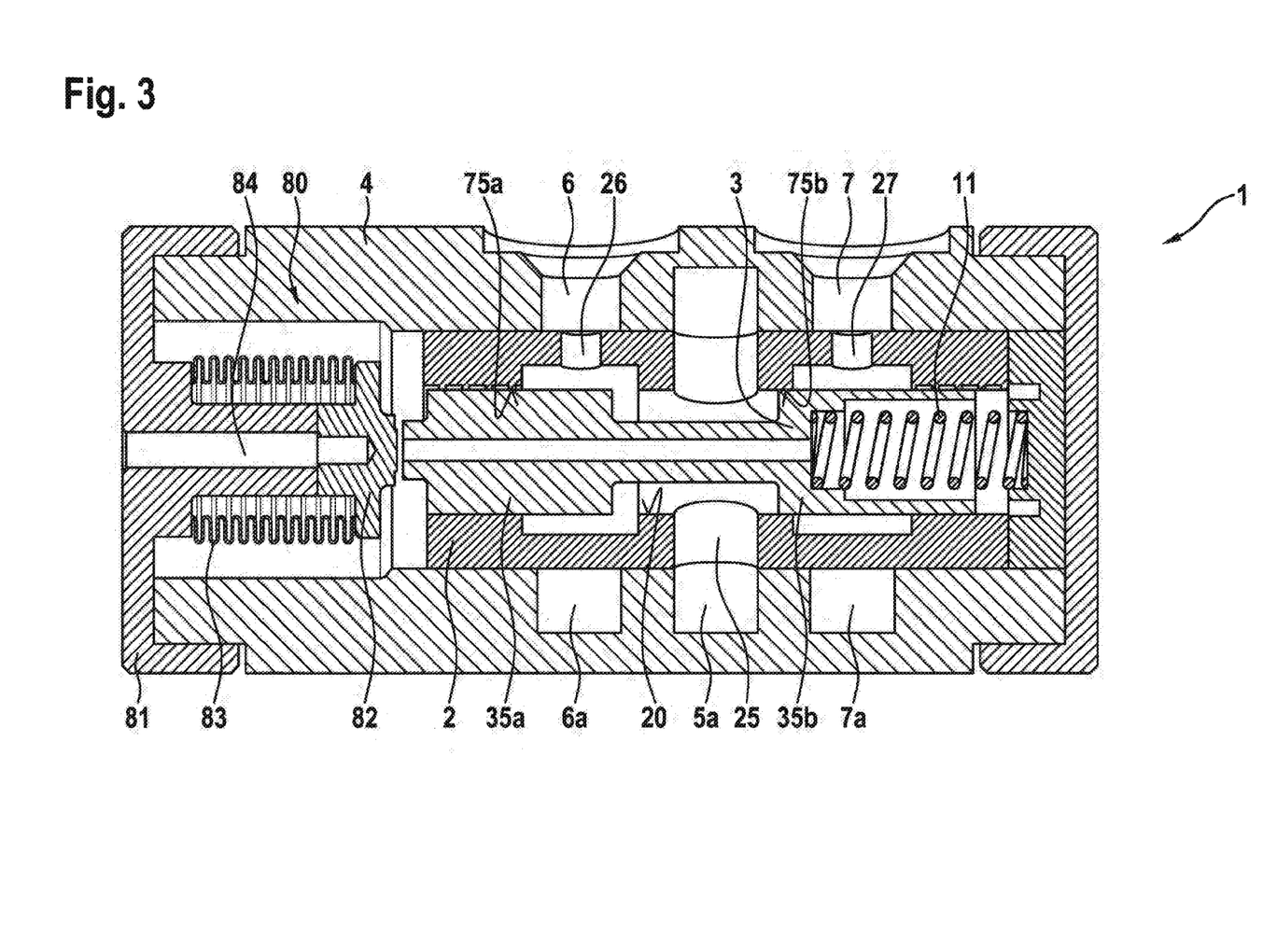
FIG. 3 shows a longitudinal section through another illustrative embodiment of the slide valve according to the invention, wherein only the essential regions are shown.

FIG. 3 shows another embodiment of the slide valve 1 according to the invention, wherein only the essential regions are shown. The slide valve 1 comprises the valve housing 4 and, formed therein, the inlet passage 5 having the annular inlet groove 5a, the outlet passage 6 having the annular outlet groove 6a and the further outlet passage 7 having the further annular outlet groove 7a.

Similarly to the illustrative embodiment in FIG. 1, the valve tube 2 is furthermore arranged in the valve housing 4. The inlet bore 25, the first outlet bore 26 and the second outlet bore 27, which communicate with the associated inlet and outlet passages 5, 6, 7, are formed in the valve tube 2.

Like the illustrative embodiment in FIG. 2, the slide valve 1 in FIG. 3 is an outlet-controlled slide valve. For this purpose, the closing body 35a is formed at one end of the slide 3 and the further closing body 35b is formed at the opposite end. Each of the two closing bodies 35a, 35b forms a slide seat 75a, 75b with the guide bore 20 formed in the valve tube 2. Here, the closing body 35a interacts with the first outlet bore 26 and with it forms the slide seat 75a in order to open and close the first outlet bore 26 and accordingly to open and close the first hydraulic connection from the inlet passage 5 to the outlet passage 6. At the same time, the further closing body 35b interacts to the opposite extent with the second outlet bore 27 and with it forms the further slide seat 75b in order to open and close the second outlet bore 27 and accordingly to open and close the second hydraulic connection from the inlet passage 5 to the further outlet passage 7. This means that, to the extent to which the through flow cross section through the first hydraulic connection is increased by the stroke of the slide 3, the through flow cross section through the second hydraulic connection is reduced and vice versa.

In the illustrative embodiment in FIG. 3, behavior in respect of the central position and the end position of the slide 3 is similar to the embodiment in FIG. 2. In the illustrative embodiment in FIG. 3, the slide valve 1 is fitted with a pneumatic or hydraulic drive. For this purpose, the slide valve 1 has a metal-bellows drive unit 80 having a drive housing 81, a drive head 82 and a metal bellows 83. The drive housing 81 is fixed in relation to the valve housing 4, being screwed to the latter for example. The drive head 82 is connected to the drive housing 81 in such a way by the metal bellows 83 that it can move axially relative to said housing. A working space 84, e.g. in the form of bores, is formed in the drive housing 81 and in the drive head 82. In this arrangement, the metal bellows 83 closes the working space 84 in a medium-tight manner. The drive head 82 interacts on its side remote from the working space 84 with the closing body 35a.

Arranged in the valve housing 4, on the opposite side of the slide 3 from the metal-bellows drive unit 80, is a bracing spring 11, which also interacts with the slide 3, in the specific embodiment in FIG. 3 with the further closing body 35b. The bracing spring 11 counteracts the metal-bellows drive unit 80, with the result that the slide 3 is braced between these two.

When the working space 84 is not under pressure, the slide valve 1 or slide 3 is in a position as shown in FIG. 3 owing to the force of the bracing spring 11. The closing body 35a exposes the outlet passage 6, and the further closing body 35b covers the further slide seat 75b and thus closes the further outlet passage 7. In this position, the first hydraulic connection is open and the second hydraulic connection is closed.

When the working space 84 is filled with a pressurized fluid, the drive head 82 is pushed in the direction of the slide 3 counter to the force of the bracing spring 11. The closing body 35a then covers the slide seat 75a and thus closes the outlet passage 6, and the further closing body 35b exposes the further outlet passage 7. In this opposite end position, the first hydraulic connection is closed and the second hydraulic connection is open.

Through specific design of the bracing spring 11, including as a progressive spring for example, and through changing the pressure in the working space 84, the slide 3 can also be moved into any desired intermediate positions. It is thereby possible to use the slide valve 3 as a proportional mass flow splitter for the two outlet passages 6, 7.

According to the invention, the two sliding contacts or sliding pairs of closing body 35a with respect to guide bore 20 and of the further closing body 35b with respect to guide bore 20 are also embodied as steel-graphite pairs or as ceramic-graphite pairs in the illustrative embodiment in FIG. 3. Here, the preferred steel is M340 or, alternatively, a metal having a Tribobond 62 coating. As an alternative, the two ceramics $ZrO_2$ and $Al_2O_3$ can preferably be used. The graphite sliding partner is preferably made from EK305, EK3255 or EK3245.

In advantageous variants of the illustrative embodiment in FIG. 3, the valve tube 2 with the guide bore 20 formed therein is made from graphite, and the slide 3 with the two closing bodies 35a, 35b is made from steel or from ceramic, particularly preferably from M340 steel.

Figure 4:
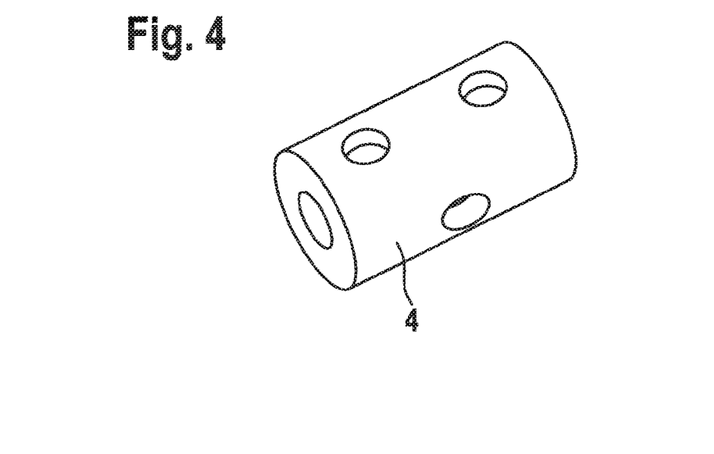
FIG. 4 shows a perspective view of an embodiment of a valve housing for a slide valve according to the invention.

FIG. 4 shows an embodiment of a valve housing 4 of a slide valve 1 according to the invention in a perspective view. The inlet passage 5 and, offset relative to the latter by 90° in the circumferential direction, the outlet passage 6 and the further outlet passage 7 are arranged in the valve housing 4.

Figure 5:
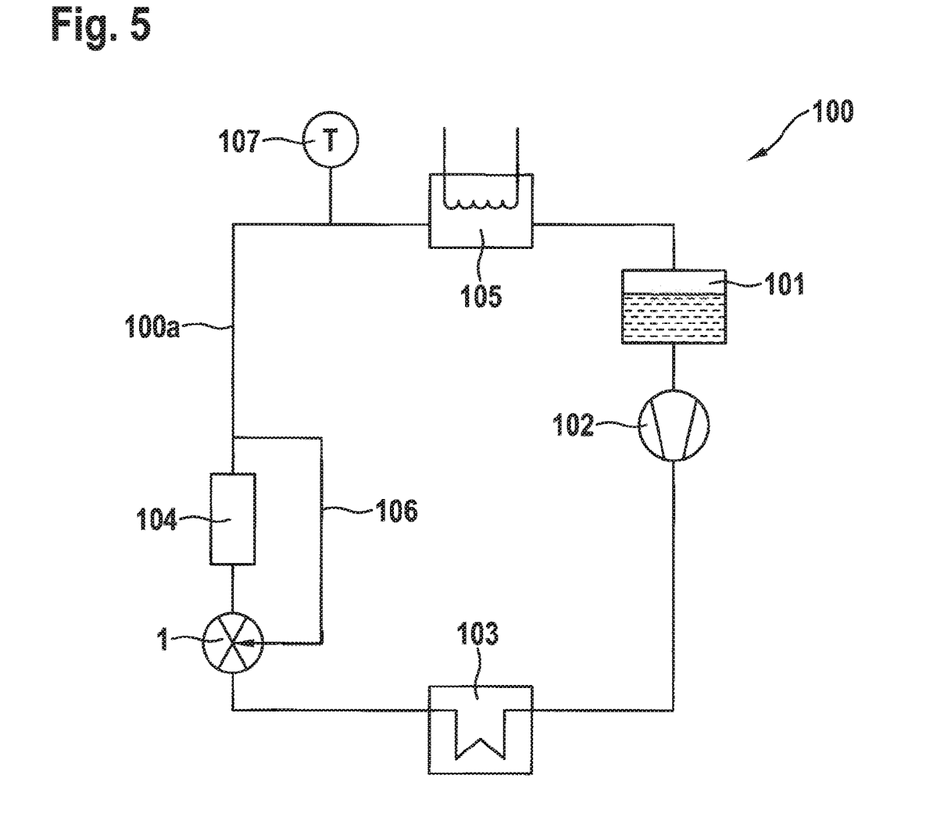
FIG. 5 shows schematically a slide valve according to the invention within a waste heat recovery system.

FIG. 5 shows the slide valve 1 according to the invention within a waste heat recovery system 100 as a bypass valve. The waste heat recovery system 100 has a circuit 100a, which carries a working medium and, in the direction of flow of the working medium, comprises a reservoir 101, a pump 102, an evaporator 103, the slide valve 1 in the form of a bypass valve, an expansion machine 104 and a condenser 105. As an alternative, the reservoir 101 can also be connected to the circuit 100a by a feed line. Liquid working medium is pumped into the evaporator 103 from the reservoir 101 by the pump 102 and is evaporated there by the heat energy of an exhaust gas of a combustion engine. The evaporated working medium is then expanded in the expansion machine, releasing mechanical energy, e.g. to a generator (not shown) or to a transmission (not shown). The working medium is then condensed again in the condenser 105 and fed back into the reservoir 101.

According to the invention, the slide valve 1 is arranged ahead of the expansion machine 104 within the circuit 100a and is embodied as a bypass valve for the expansion machine 104. For this purpose, a bypass line 106 is arranged parallel to the expansion machine 104. Depending on the operating state of the combustion engine and variables resulting therefrom, e.g. temperatures of the working medium, the working medium is fed to the expansion machine 104 through the slide valve 1 or guided past the expansion machine through the bypass line 106. By way of example, a temperature sensor 107 is arranged ahead of the condenser 105. The temperature sensor 107 determines the temperature of the working medium ahead of the condenser 105 and transmits a corresponding signal to a control unit (not shown). The control unit controls the control valve 1, e.g. by means of the metal-bellows drive unit 80 or an electromagnetic drive unit, in accordance with various data, e.g. the temperature of the working medium ahead of the condenser 105.

The slide valve 1 is switched in such a way that the working medium is passed either through the expansion machine 104 or through the bypass line 106. It is thereby possible to ensure, for example, that working medium is passed through the expansion machine 104 only in the superheated steam state, if required. Since the slide valve 1 is designed as a 3/3-way valve, the mass flow of the working medium can also be divided, with the result that part of the working medium is fed to the expansion machine 104 and another part is fed to the bypass line 106.

The slide valve 1 according to the invention operates as follows:

The working medium to be delivered is fed to the slide valve 1 via the inlet passage 5. The slide valve 1 is controlled by a control unit, e.g. the metal-bellows drive unit 80, in such a way that the mass flow of the working medium is divided proportionally between the two outlet passages 6, 7. For this purpose, the supply valve 1 can be embodied as an inlet- or outlet-controlled valve.

If the slide valve 1 is embodied as an inlet-controlled slide valve 1, the closing body 35 interacts with the inlet bore/s 25, 25a, 25b or passages 5 in such a way that the working medium mass flow is divided proportionally by the closing body 35 in the direction of the outlet passage 6 and in the direction of the further outlet passage 7 upon entry into the guide bore 20. The closing body 35 forms the slide seat 75 with the guide bore 20 in the region of the inlet bores 25, 25a, 25b or in the region of the inlet passage 5 or of the annular inlet groove 5a. Depending on the axial position of the slide 3, the working medium flows through the first hydraulic connection in the direction of the outlet passage 6 on one side of the closing body 35 and/or flows through the second hydraulic connection in the direction of the further outlet passage 7 on the opposite side of the closing body 35. In this case, any desired intermediate positions of the closing body 35 with proportional mass flow division between the two outlet passages 6, 7 can be set.

If the slide valve 1 is embodied as an outlet-control slide valve 1, the closing body 35a interacts with the first outlet bore 26 or with the outlet passage 6 and the further closing body 35b simultaneously interacts with the second outlet bore 26 or with the further outlet passage 7 in such a way that the working medium mass flow is divided proportionally by the two closing bodies 35a, 35b in the direction of the outlet passage 6 and in the direction of the further outlet passage 7 upon entry into the guide bore 20. The closing body 35a forms a slide seat 75a with the guide bore 20 in the region of the first outlet bore 26 or in the region of the outlet passage 6 or of the annular outlet groove 6a. The further closing body 35b forms a further slide seat 75b with the guide bore 20 in the region of the second outlet bore 27 or in the region of the further outlet passage 7 or of the further annular outlet groove 6a.

Depending on the axial position of the slide 3, the working medium flows past the closing body 35a and through the slide seat 75 or through the first hydraulic connection in the direction of the outlet passage 6 and/or flows past the further closing body 35b and through the second slide seat 75b or through the second hydraulic connection in the direction of the further outlet passage 7 on the opposite side of the slide 3. In this case, any desired intermediate positions of the slide 3 with proportional mass flow division between the two outlet passages 6, 7 can be set.

As an alternative, the slide valve 1 can also be embodied in such a way that only one outlet passage 6, 7 is open at any one time.

The embodiments of the slide valve 1 according to the invention are very well-suited to use within a waste heat recovery system 100 of a combustion engine, as shown in FIG. 5, since proportional division of the working medium mass flow may be required there, e.g. when using a bypass line 106. Moreover, the above-described slide valves can be very well adapted to the requirements of a waste heat recovery system 100, particularly to the aggressive working media flowing therein, especially at high temperatures, e.g. about 300° C.

The invention claimed is:

1. A slide valve (1), having a valve housing (4), wherein an inlet passage (5) and an outlet passage (6) are formed in the valve housing (4), wherein a substantially cylindrical slide (3) is guided in a longitudinally movable manner in a guide bore (20) in the valve housing (4), wherein the guide bore (20) is configured to be connected hydraulically to the inlet passage (5) and to the outlet passage (6), wherein a closing body (35, 35a) is arranged on the slide (3), wherein a slide seat (75, 75a) is formed between the guide bore (20) and the closing body (35, 35a), wherein the guide bore (20) and the sliding body (35, 35a) form a sliding pair, and wherein the sliding pair has a material combination steel-graphite, in which the guide bore is graphite and the sliding body is steel, or wherein the sliding pair has a material combination ceramic-graphite, in which the guide bore is ceramic and the sliding body is graphite, or the guide bore is graphite and the sliding body is ceramic.

2. The slide valve (1) according to claim 1, characterized in that the sliding pair has the material combination steel-graphite.

3. The slide valve (1) according to claim 1, characterized in that the sliding pair has the material combination steel-graphite and the steel is coated with a Ti(C,N)+$MoS_2$ coating.

4. The slide valve (1) according to claim 1, characterized in that the sliding pair has the material combination ceramic-graphite and in that the ceramic is a $ZrO_2$ or $Al_2O_3$ ceramic.

5. The slide valve (1) according to claim 1, characterized in that the graphite is provided with metal additives.

6. The slide valve (1) according to claim 1, characterized in that a further outlet passage (7) is formed in the valve housing (4), wherein the guide bore (20) is configured to be connected hydraulically to the further outlet passage (7), and in that a further closing body (35b) is arranged on the slide (3), wherein a further slide seat (75b) is formed between the guide bore (20) and the further closing body (35b), wherein the guide bore (20) and the further closing body (35b) form a further sliding pair, and wherein the further sliding pair has the material combination steel-graphite or the material combination ceramic-graphite.

7. The slide valve (1) as claimed in claim 1, characterized in that a valve tube (2) is arranged in the valve housing (4) and in that the guide bore (20) is formed in the valve tube (20).

8. The slide valve (1) according to claim 7, characterized in that the valve tube (2) is embodied as a graphite bushing.

9. A waste heat recovery system (100) comprising a bypass valve (1) including a slide valve (1) according to claim 1, the system also comprising a circuit (100a) carrying a working medium, wherein the circuit (100a) includes, in a direction of flow of the working medium, a pump (102), an evaporator (103), the bypass valve (1), an expansion machine (104) and a condenser (105), wherein a bypass line (106) is arranged in parallel with the expansion machine (104) and wherein the bypass valve (1) controls the mass flow of the working medium to the expansion machine (104) and to the bypass line (106).

10. The waste heat recovery system (100) according to claim 9, characterized in that the working medium contains ethanol or cyclopentane.

11. The waste heat recovery system (100) according to claim 9, characterized in that the bypass valve is configured to be operated at a temperature of the working medium of 300° C.

12. The slide valve (1) according to claim 1, characterized in that the sliding pair has the material combination steel-graphite and the steel is coated with a low-friction material.

13. A slide valve (1), having a valve housing (4), wherein an inlet passage (5) and an outlet passage (6) are formed in the valve housing (4), wherein a substantially cylindrical slide (3) is guided in a longitudinally movable manner in a guide bore (20) in the valve housing (4), wherein the guide bore (20) is configured to be connected hydraulically to the inlet passage (5) and to the outlet passage (6), wherein a closing body (35, 35a) is arranged on the slide (3), wherein a slide seat (75, 75a) is formed between the guide bore (20) and the closing body (35, 35a), wherein the guide bore (20) and the sliding body (35, 35a) form a sliding pair, and wherein the sliding pair has a material combination steel-graphite, in which the guide bore is graphite and the sliding body is steel.

14. The slide valve (1) according to claim 13, characterized in that the steel is coated with a Ti(C,N)+$MoS_2$ coating.

15. A slide valve (1), having a valve housing (4), wherein an inlet passage (5) and an outlet passage (6) are formed in the valve housing (4), wherein a substantially cylindrical slide (3) is guided in a longitudinally movable manner in a guide bore (20) in the valve housing (4), wherein the guide bore (20) is configured to be connected hydraulically to the inlet passage (5) and to the outlet passage (6), wherein a closing body (35, 35a) is arranged on the slide (3), wherein a slide seat (75, 75a) is formed between the guide bore (20) and the closing body (35, 35a), wherein the guide bore (20) and the sliding body (35, 35a) form a sliding pair, and wherein the sliding pair has a material combination ceramic-graphite, in which the guide bore is ceramic and the sliding body is graphite, or the guide bore is graphite and the sliding body is ceramic.

16. The slide valve (1) according to claim 15, characterized in that the sliding pair has the material combination ceramic-graphite and in that the ceramic is a $ZrO_2$ or $Al_2O_3$ ceramic.

* * * * *